US011235659B2

(12) United States Patent
Dvorak

(10) Patent No.: US 11,235,659 B2
(45) Date of Patent: Feb. 1, 2022

(54) ACTUATING DEVICE FOR ACTUATED OPENING OF A COVER

(71) Applicant: ILLINOIS TOOL WORKS INC., Glenview, IL (US)

(72) Inventor: Jan Dvorak, Niederstetten (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 65 days.

(21) Appl. No.: 16/792,659

(22) Filed: Feb. 17, 2020

(65) Prior Publication Data

US 2020/0269683 A1  Aug. 27, 2020

(30) Foreign Application Priority Data

Feb. 26, 2019 (EP) .................................... 19159532
May 16, 2019 (DE) ..................... 10 2019 112 885.4

(51) Int. Cl.
*B60K 15/05* (2006.01)
*E05B 47/00* (2006.01)
(Continued)

(52) U.S. Cl.
CPC .......... *B60K 15/05* (2013.01); *E05B 47/0004* (2013.01); *E05B 81/06* (2013.01);
(Continued)

(58) Field of Classification Search
CPC ............ B60K 515/05; B60K 2015/053; B60K 2015/0538; B60K 2015/0576;
(Continued)

(56) References Cited

U.S. PATENT DOCUMENTS

| 2011/0252599 A1* | 10/2011 | Kutschat ................. E05C 17/46 |
| | | 16/82 |
| 2012/0222356 A1* | 9/2012 | Beck ....................... B60K 15/05 |
| | | 49/348 |

(Continued)

FOREIGN PATENT DOCUMENTS

| DE | 202011052026 U1 * | 2/2013 | ............. E05B 79/20 |
| DE | 102012004071 A1 | 9/2013 | |

(Continued)

OTHER PUBLICATIONS

Witte Automotive, "Actuating device, in particular for a lock in a motor vehicle", Apr. 11, 2013, German Patent Office, DE20201152026 (Year: 2013).*

(Continued)

*Primary Examiner* — Dennis H Pedder
*Assistant Examiner* — Joyce Eileen Hill
(74) *Attorney, Agent, or Firm* — Thompson Hine LLP

(57) ABSTRACT

An actuating device for opening and closing a cover in or on a vehicle includes a housing, a rotatable plunger, a spring that preloads the plunger into a discharge position, and an actuating sleeve into which the plunger can be introduced. At least one actuating groove extends helically around the longitudinal axis of the actuating sleeve and is formed on the inside of the sleeve. At least one actuating projection of the plunger engages into the actuating groove when the plunger is introduced into the actuating sleeve causing the plunger to rotate about its longitudinal axis during an axial relative movement between the actuating sleeve and the plunger. A blocking device blocks plunger movement into the discharge position to hold the plunger in a locked position. A spring element preloads the blocking device into a blocking position, and an actuator disengages the blocking device from the blocking position.

20 Claims, 3 Drawing Sheets

(51) Int. Cl.
    *E05B 81/06* (2014.01)
    *E05B 83/04* (2014.01)
    *E05B 83/34* (2014.01)

(52) U.S. Cl.
    CPC ............ *B60K 2015/0538* (2013.01); *B60K 2015/0576* (2013.01); *B60K 2015/0584* (2013.01); *E05B 83/34* (2013.01)

(58) Field of Classification Search
    CPC ......... B60K 2015/0584; E05B 47/0004; E05B 81/06; E05B 83/34
    USPC ...................................... 296/97.22
    See application file for complete search history.

(56) References Cited

U.S. PATENT DOCUMENTS

| 2015/0008685 | A1 | 2/2015 | Beck |
| 2016/0305166 | A1* | 10/2016 | Georgi ............... E05B 81/18 |
| 2016/0348408 | A1* | 12/2016 | Watanabe ............ E05C 19/028 |
| 2019/0093392 | A1 | 3/2019 | Schwab |
| 2019/0242161 | A1 | 8/2019 | Beck |

FOREIGN PATENT DOCUMENTS

| DE | 102018123949 A1 | 3/2019 | |
| FR | 3016854 A1 * | 7/2015 | ............ B60K 15/05 |
| WO | WO-9828557 A1 * | 7/1998 | ............ F16H 59/70 |
| WO | WO-0107738 A1 * | 2/2001 | ............ E05B 81/16 |
| WO | WO-2016103210 A1 * | 6/2016 | ............ B60K 15/05 |

OTHER PUBLICATIONS

Malik et al., "Blocking device with a side switch", Feb. 7, 1998, German Patent Office. WO9828557A (Year: 1998).*
Perez et al., "Closure and Opening Device for Closing and Opening an Automotive Vehicle Opener and Fuel Trap Comprising Such a Closing and Opening Device" Jul. 31, 2015, French Patent Office, FR3016854A1 (Year: 2015).*

* cited by examiner

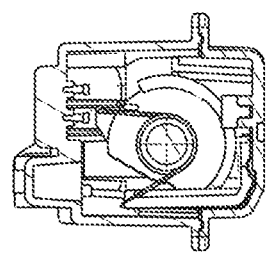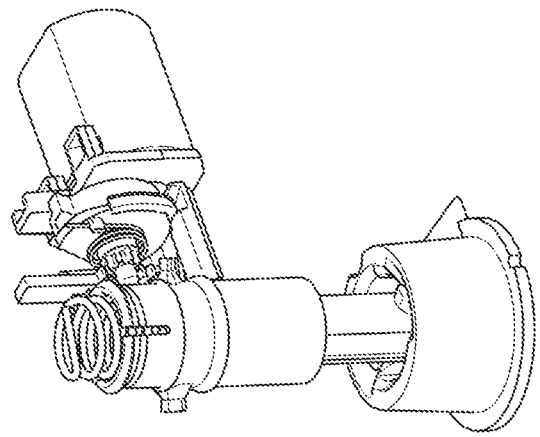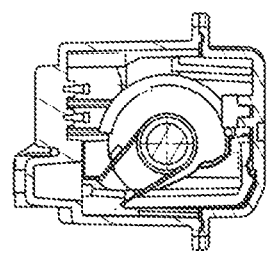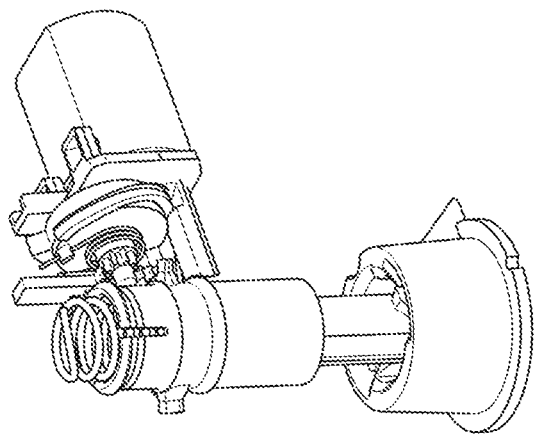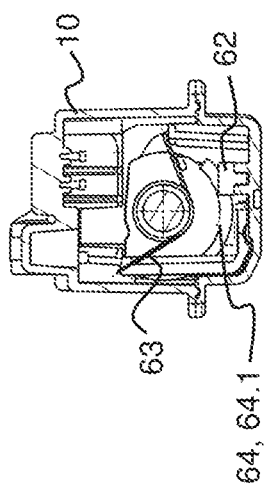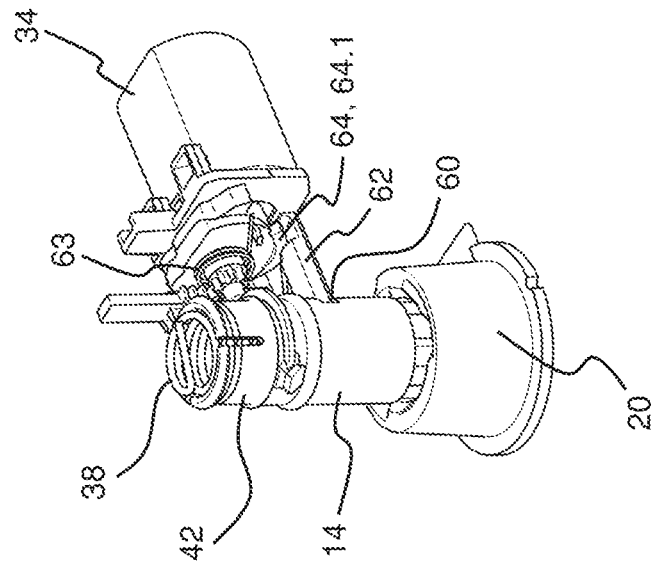

ACTUATING DEVICE FOR ACTUATED OPENING OF A COVER

TECHNICAL FIELD

The invention relates generally to actuating devices for covers in the automobile sector.

BACKGROUND

The prior art DE 10 2012 004 071 A1 shows an actuating device for actuated opening of a cover, in which a plunger is fixed to the cover and engages in a base unit. Reliable sealing of the base unit against environmental influences is difficult.

DE 10 2018 123 949 A1, published after the priority date of this application to be treated here relates to an actuating device for the manual opening of a cover, wherein a plunger is rotatably movably supported in a base unit and, with an actuating sleeve on the cover, which has a helical groove on its inner wall, forms a manually releasable lock. Differing therefrom, according to the invention described below, the lock is preferably releasable under remote control by an actuator, so that the cover opens automatically following actuation of the actuator. Many components of the invention treated here coincide with the components which are described in DE 10 2018 123 949 A1. To this extent, this point in the description from DE 10 2018 123 949 A1 is incorporated by reference in the description of the invention treated here.

The inventors found it disadvantageous that sealing the base part of an actuating device for the actuated opening of a cover according to the prior art is difficult. The object on which the invention is based was to improve this disadvantage.

SUMMARY

The object is achieved by the invention, in particular as it is defined in the independent claims.

In particular, this object is achieved by an actuating device, wherein the actuating device is designed for opening and closing a cover, which is preferably a tank cover or charging-recess cover, in or on a vehicle, comprising:
 a housing, which is suitable for installation in a vehicle,
 a plunger, which is mounted in such a way as to be rotatable about its longitudinal axis in the housing and which has an outer actuating end projecting out of the housing via a housing opening and an inner actuating end lying opposite the outer actuating end and situated within the housing,
 a spring, in particular, a torsion spring, preferably in the housing, which preloads the plunger into a discharge position, which is preferably a first rotary position of the plunger,
 an actuating sleeve, which can be connected or is connected to the cover or to a part that carries the cover, for example by being produced in one piece with the cover or the part that carries the cover, and into which the plunger can be introduced by means of its outer actuating end, and at least one actuating groove extending helically around the longitudinal axis of the actuating sleeve, at least in some section or sections, is formed on the inside of said sleeve, into which groove at least one actuating projection of the plunger engages when the plunger has been introduced into the actuating sleeve, with the result that the plunger is rotated about its longitudinal axis during an axial relative movement between the actuating sleeve and the plunger, wherein the spring is extended, preferably twisted, counter to its preloading as the plunger is rotated in the course of the introduction of the plunger into the actuating sleeve,
 a blocking device, by means of which the plunger can be blocked against a movement into the discharge position in a locked position, which is preferably a second rotary position of the plunger rotated with respect to the discharge position, wherein the blocking device is designed to preload the blocking device by means of a spring element of the blocking device into a blocking position, in which the plunger is held in the locked position, and to disengage the blocking position by means of an actuator, preferably an electric motor, of the blocking device.

In this way, the base part, which is formed by the housing and the components fitted thereto, can be sealed off more simply, since no opening of the housing exists from which the plunger must move in and/or out.

Preferably, the following is true in the locked position and/or discharge position of the plunger: when the plunger has been introduced axially completely into the actuating sleeve and is in the locked position, the plunger cannot be released axially from the actuating sleeve without rotating the plunger, because of the actuating groove. When the actuating projection is located at the height of the front edge of the actuating sleeve that is further removed from the cover, introduction or withdrawal of the plunger into or out of the actuating sleeve is only possible if the plunger is in its discharge position and thus the actuating projection can engage in the actuating groove.

In a further actuating device according to the invention, provision is made that the blocking device comprises a blocking bar, and wherein the plunger comprises a blocking recess on its outside, wherein the blocking bar is preloaded in the direction of the blocking recess by means of the spring element when the plunger is in the locked position, into a blocking position, in which it engages in the blocking recess, and can be moved counter to the spring element by means of the actuator into a release position retracted from the blocking recess.

In a further actuating device according to the invention, provision is made that the actuator drives the blocking bar via a cam control mechanism preferably having a drum cam, wherein a rotation of the actuator can be converted into a linear movement of the blocking bar by means of the cam control mechanism.

The drum cam is preferably formed by a worm gear.

In a further actuating device according to the invention, provision is made that the spring element preloads a component of the cam control mechanism, preferably the drum cam, in one direction, with the result that this preloading brings about the preloading of the blocking bar into the blocking position.

Preferably, the arrangement is such that, as a result of activation of the actuator, the spring element is preloaded still further and, as a result of deactivation of the actuator, the spring element moves the component of the cam control mechanism back in the direction of the blocking position again. The blocking bar then bears on the plunger with a certain preload and, as soon as the blocking recess is rotated to the height of the blocking bar again as a result, for example, of closing the cover and thus rotation of the actuating sleeve induced via the actuating groove and actuating projection on the plunger, the preloaded blocking bar is moved into the blocking recess and locked.

In a further actuating device according to the invention, provision is made that the spring element is a torsion spring.

In a further actuating device according to the invention, provision is made that the actuator is an electric motor having an output axis, wherein the output axis is perpendicular to the axis of rotation of the plunger.

In a further actuating device according to the invention, provision is made that a seal, preferably a sealing ring surrounding the housing opening, is provided between the housing opening and the plunger.

In a further actuating device according to the invention, provision is made that at least one actuating groove of the actuating sleeve forms, at its inner end, at least one end receptacle, in which the at least one actuating projection of the plunger is accommodated in such a way in the state in which it is fully introduced into the actuating sleeve that the plunger cannot be released from the actuating sleeve without being rotated again in said sleeve.

In a further actuating device according to the invention, provision is made that a position sensor, which indicates an open and/or closed position of the cover, is provided.

In a further actuating device according to the invention, provision is made that the position sensor comprises a position switch, which is actuated by a position projection formed on the plunger when the cover is in the open and/or closed position.

In a further actuating device according to the invention, provision is made that a manual release device, preferably in the form of a pulling device, is provided, wherein the blocking position of the blocking device, preferably the blocking bar, can be released by manual actuation of the release device, preferably by pulling the pulling device.

In this way, a manual emergency actuating possibility is provided.

In a further actuating device according to the invention, provision is made that the release device is a pulling device having a pulling strip comprising a manually actuable actuating end, wherein the opposite end of the pulling strip is fixed in its position. The fixing is at least such that the pulling strip does not get lost.

In a further actuating device according to the invention, provision is made that the pulling device comprises an actuating section which, when pulled manually, acts on a component of the cam control mechanism or some other part of the mechanism between the actuator and the blocking bar or on the blocking bar itself in such a way that the blocking bar can be moved in the direction of its release position.

In particular, this object is also achieved by a cover, wherein the cover is a tank-recess and/or charging-recess cover and has an actuating device as claimed in any one of the preceding claims.

BRIEF DESCRIPTION OF THE DRAWINGS

The invention is now to be illustrated further by way of example by using drawings, in which:

FIGS. 2A to 2C show various states of the first embodiment in a sectional view with components partially blanked out, wherein in FIG. 2A the plunger (14) is in its locked position and the blocking bar (62) is in its blocked position and the actuator (34) is not activated, wherein in FIG. 2B the plunger (14) is in its discharge position and the blocking bar (62) is in its release position and the actuator (34) is activated, wherein in FIG. 2C the plunger (14) is in its discharge position and the blocking bar (62) is between its release position and blocking position and the actuator (34) is not activated, FIGS. 3A to 3C show the various states of the embodiment as in FIGS. 2A to 2C, but in a perspective view.

DETAILED DESCRIPTION

Figure 1:
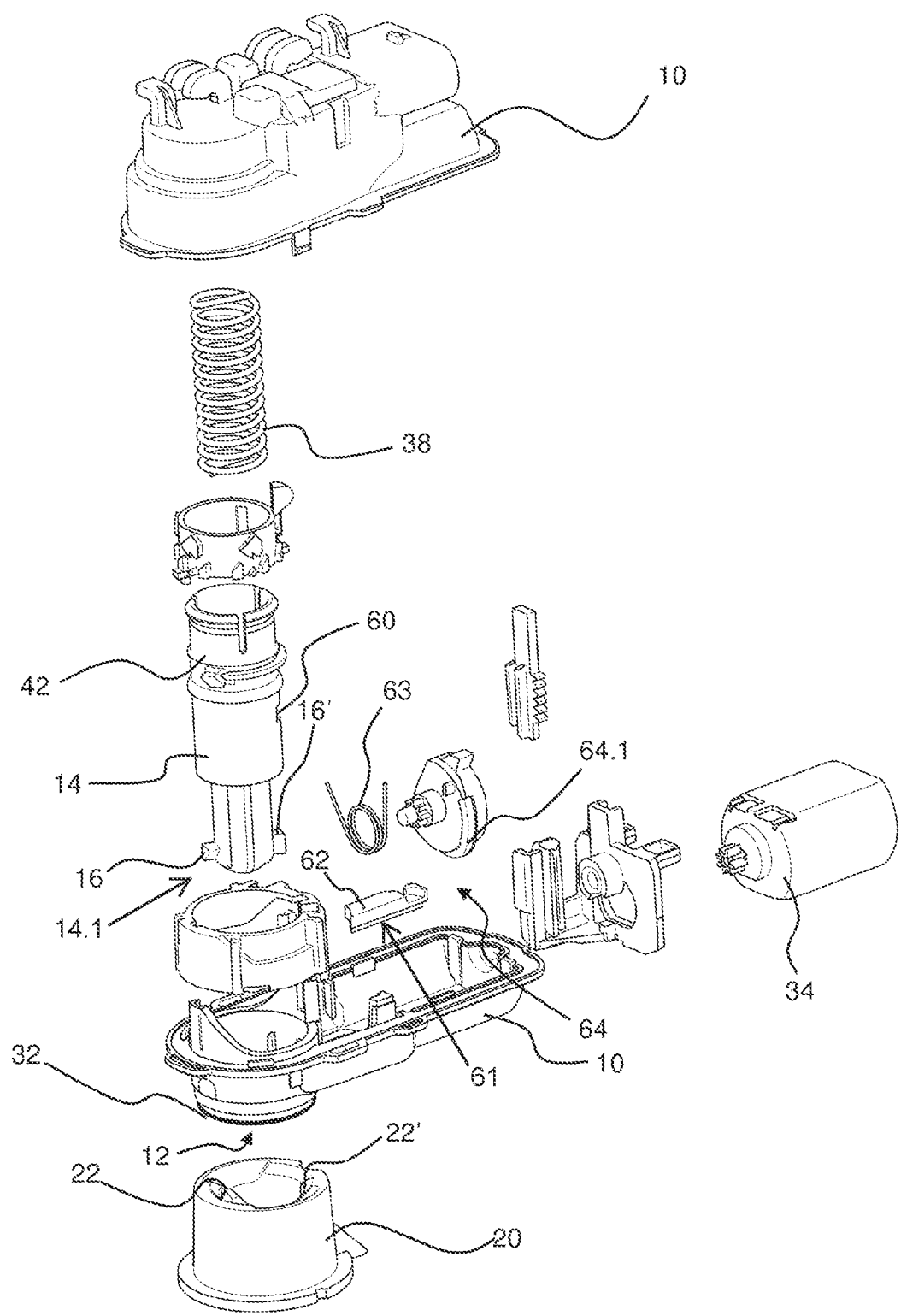
FIG. 1 shows a first embodiment of a device according to the invention.

There follows a more detailed description of FIG. 1. The configuration is such that the actuating device is designed for opening and closing a cover, which here is a tank cover or charging-recess cover, in or on a vehicle, comprising:

a housing 10, which is suitable for installation in a vehicle, a plunger 14, which is mounted in such a way as to be rotatable about its longitudinal axis in the housing 10 and which has an outer actuating end 14.1 projecting out of the housing 10 via a housing opening 12 and an inner actuating end 42 lying opposite the outer actuating end and situated within the housing, a spring 38, in particular, a torsion spring, here in the housing 10, which preloads the plunger 14 into a discharge position, which here is a first rotary position of the plunger 14, an actuating sleeve 20, which can be connected or is connected to the cover or to a part that carries the cover, for example by being produced in one piece with the cover or the part that carries the cover, and into which the plunger 14 can be introduced by means of its outer actuating end, and at least one actuating groove 22 extending helically around the longitudinal axis of the actuating sleeve 20, at least in some section or sections, is formed on the inside of said sleeve, into which groove at least one actuating projection 16 of the plunger 14 engages when the plunger 14 has been introduced into the actuating sleeve 20, with the result that the plunger 14 its rotated about its longitudinal axis during an axial relative movement between the actuating sleeve 20 and the plunger 14, wherein the spring 38 is extended, here twisted, counter to its preloading as the plunger 14 is rotated in the course of the introduction of the plunger 14 into the actuating sleeve 20, a blocking device 61, by means of which the plunger 14 can be blocked against a movement into the discharge position in a locked position, which here is a second rotary position of the plunger 14 rotated with respect to the discharge position, wherein the blocking device 61 is designed to preload the blocking device by means of a spring element 63 of the blocking device into a blocking position, in which the plunger 14 is held in the locked position, and to disengage the blocking position by means of an actuator 34, here an electric motor, of the blocking device. This configuration is such that the blocking device 61 comprises a blocking bar 62, wherein the plunger 14 comprises a blocking recess 60 on its outside, wherein the blocking bar 62 is preloaded in the direction of the blocking recess 60 by means of the spring element 63 when the plunger is in the locked position, into a blocking position, in which it engages in the blocking recess 60, and can be moved counter to the spring element 63 by means of the actuator 34 into a release position retracted from the blocking recess 60. The configuration is such that the actuator 34 drives the blocking bar 62 via a cam control mechanism 64, here having a drum cam 64.1 wherein a rotation of the actuator 34 can be converted into a linear movement of the blocking bar 62 by means of the cam control mechanism 64. The drum cam is formed by a worm gear here. The configuration is such that the spring element 63 preloads a component of the cam control mechanism 64, here the drum cam 64.1, in one direction, with the result that this preloading brings about the preloading of the blocking bar 62 into the blocking position. The configuration is such that the spring element 63 is a torsion spring. The configuration is such that the actuator 34 is an electric motor having an output axis, wherein the output axis is perpendicular to the axis of rotation of the plunger 14. The configuration is such that a seal, preferably a sealing ring 32 surrounding the housing opening 12, is provided between the housing opening 12 and the plunger 14. The configuration is such that the at least one actuating groove 22 of the actuating sleeve 20 forms, at its inner end, at least one end receptacle, in which the at least one actuating projection of the plunger 14 is accommodated in such a way in the state in which it is fully introduced into the actuating sleeve 20 that the plunger 14 cannot be released from the actuating sleeve 20 without being rotated again in sleeve.

Figure 4:
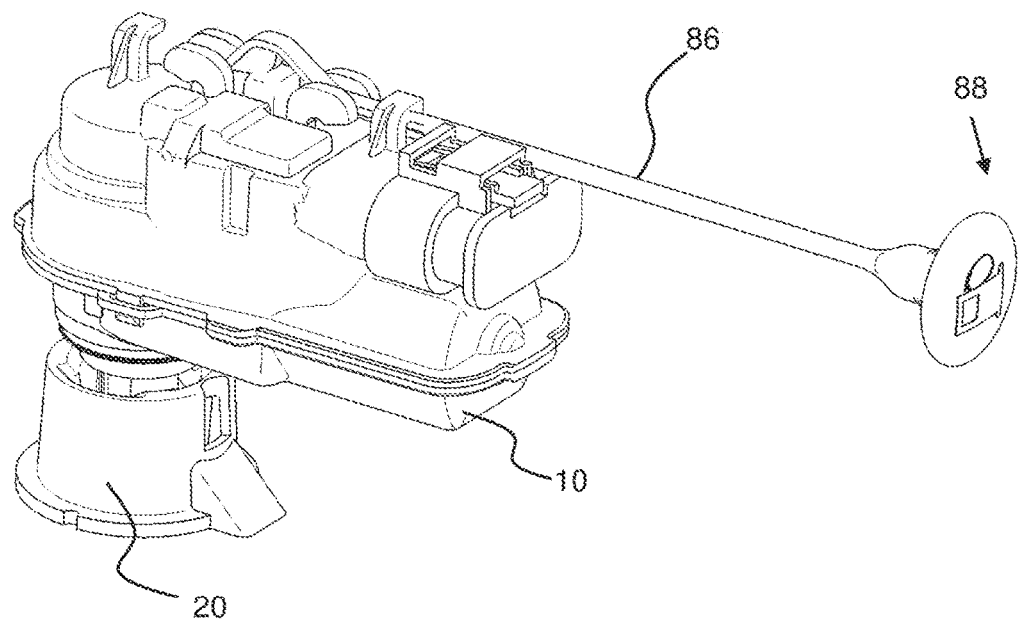
FIG. 4 shows the first embodiment with partially assembled housing (10)

There follows a more detailed description of FIG. 4. The configuration is such that a position sensor, which indicates an open and/or closed position of the cover, is provided. The configuration is such that the position sensor comprises a position switch 70, which is actuated by a position projection 72 formed on the plunger 14 when the cover is in the open and/or closed position.

Figure 5:
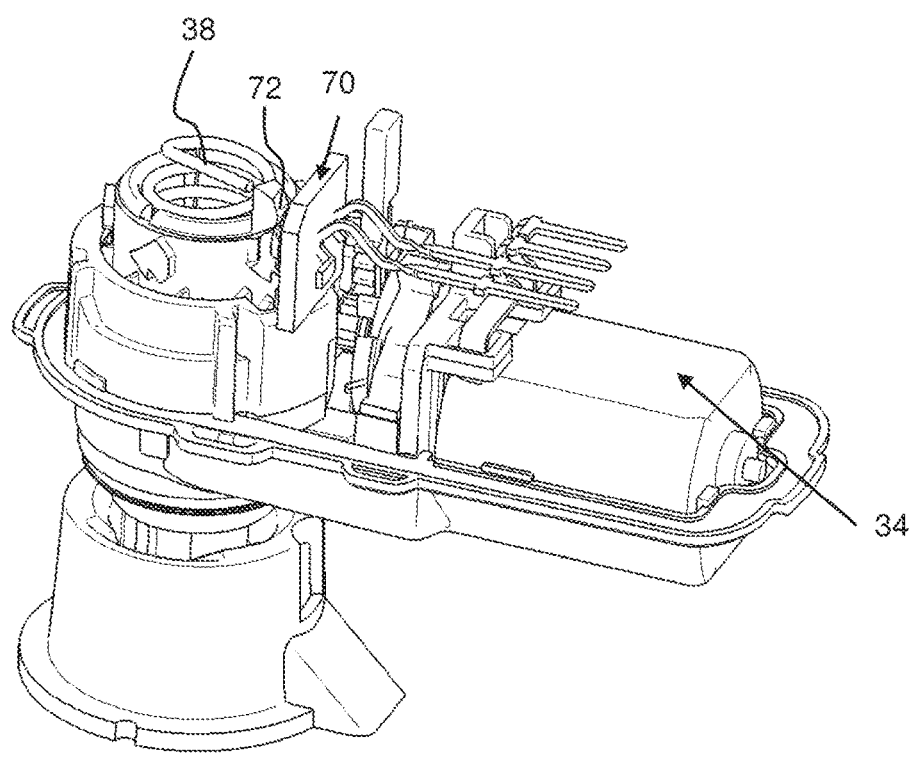
FIG. 5 shows the first embodiment with assembled housing (10).

There follows a more detailed description of FIG. 5. The configuration is such that a pulling device is provided, wherein the blocking position of the blocking device, here the blocking bar 62, can be released by manually pulling the pulling device. The configuration is such that the pulling device has a pulling strip 86 comprising a manually actuable actuating end 88, wherein the opposite end of the pulling strip 86 is fixed in its position in such a way that the pulling strip does not get lost. The configuration is such that the pulling device comprises an actuating section which, when pulled manually, acts on a component of the cam control mechanism 64 or some other part of the mechanism between the actuator 34 and the blocking bar 62 or on the blocking bar 62 itself in such a way that the blocking bar 62 can be moved in the direction of its release position.

LIST OF DESIGNATIONS

- 10 Housing
- 12 Housing opening
- 14 Mounted plunger
- 16 Actuating projection
- 20 Actuating sleeve
- 22 Actuating groove
- 32 Sealing ring
- 34 Actuator
- 38 Spring
- 42 Inner actuating end
- 60 Blocking recess
- 62 Blocking bar
- 63 Spring element
- 64 Cam control mechanism
- 64.1 Drum cam
- 70 Position switch
- 72 Position projection
- 86 Pulling strip
- 88 Actuable actuating end

What is claimed is:

1. An actuating device, wherein the actuating device is designed for opening and closing a cover in or on a vehicle, comprising:
    a housing, which is suitable for installation in a vehicle,
    a plunger, which is mounted in such a way as to be rotatable about its longitudinal axis in the housing and which has an outer actuating end projecting out of the housing via a housing opening and an inner actuating end lying opposite the outer actuating end and situated within the housing,
    a spring, which preloads the plunger into a discharge position,
    an actuating sleeve, which can be connected or is connected to the cover or to a part that carries the cover and into which the plunger can be introduced by means of its outer actuating end, and at least one actuating groove extending helically around the longitudinal axis of the actuating sleeve, at least in some section or sections, is formed on the inside of said actuating sleeve, into which actuating groove at least one actuating projection of the plunger engages when the plunger has been introduced into the actuating sleeve, with the result that the plunger is rotated about its longitudinal axis during an axial relative movement between the actuating sleeve and the plunger, wherein the spring is extended counter to its preloading as the plunger is rotated in the course of the introduction of the plunger into the actuating sleeve,
    a blocking device, by means of which the plunger can be blocked against a movement into the discharge position in a locked position, wherein the blocking device is designed to preload the blocking device by means of a spring element of the blocking device into a blocking position, in which the plunger is held in the locked position, and to disengage the blocking position by means of an actuator of the blocking device.

2. The actuating device as claimed in claim 1,
    wherein the blocking device comprises a blocking bar, and wherein the plunger comprises a blocking recess on its outside, wherein the blocking bar is preloaded in the direction of the blocking recess by means of the spring element when the plunger is in the locked position, into a blocking position, in which it engages in the blocking recess, and can be moved counter to the spring element by means of the actuator into a release position retracted from the blocking recess.

3. The actuating device as claimed in claim 2,
    wherein the actuator drives the blocking bar via a cam control mechanism preferably having a drum cam, wherein a rotation of the actuator can be converted into a linear movement of the blocking bar by means of the cam control mechanism.

4. The actuating device as claimed in claim 3,
    wherein the spring element preloads a component of the cam control mechanism, preferably the drum cam, in one direction, with the result that this preloading brings about the preloading of the blocking bar into the blocking position.

5. The actuating device as claimed in claim 4,
    wherein the spring element is a torsion spring.

6. The actuating device as claimed in claim 1,
wherein the actuator is an electric motor having an output axis, wherein the output axis is perpendicular to the axis of rotation of the plunger.

7. The actuating device as claimed in claim 1,
wherein a seal, preferably a sealing ring surrounding the housing opening, is provided between the housing opening and the plunger.

8. The actuating device as claimed in claim 1,
wherein the at least one actuating groove of the actuating sleeve forms, at its inner end, at least one end receptacle, in which the at least one actuating projection of the plunger is accommodated in such a way in the state in which it is fully introduced into the actuating sleeve that the plunger cannot be released from the actuating sleeve without being rotated again in said actuating sleeve.

9. The actuating device as claimed in claim 1,
wherein a position sensor, which indicates an open and/or closed position of the cover, is provided.

10. The actuating device as claimed in claim 9,
wherein the position sensor comprises a position switch, which is actuated by a position projection formed on the plunger when the cover is in the open and/or closed position.

11. The actuating device as claimed in claim 1,
wherein a manual release device is provided, wherein the blocking position of the blocking device can be released by manual actuation of the release device.

12. The actuating device as claimed in claim 11,
wherein the release device is a pulling device having a pulling strip comprising a manually actuable actuating end, wherein the opposite end of the pulling strip is fixed in its position.

13. The actuating device as claimed in claim 12,
wherein the pulling device comprises an actuating section which, when pulled manually, acts on a component of the cam control mechanism or some other part of the mechanism between the actuator and the blocking bar or on the blocking bar itself in such a way that the blocking bar can be moved in the direction of its release position.

14. A cover,
wherein the cover is a tank-recess and/or charging-recess cover and has an actuating device as claimed in claim 1.

15. An actuating device for opening and closing a cover in or on a vehicle, comprising:
a housing having an opening;
a plunger in the housing and having a longitudinal axis, the plunger rotatable about the longitudinal axis, the plunger having an outer actuating end projecting out of the housing via the opening of the housing and an inner actuating end situated within the housing, the outer actuating end including at least one actuating projection;
a spring positioned to preload the plunger into a discharge position;
an actuating sleeve connected to the cover or to a part that carries the cover and into which the outer actuating end can be introduced, at least one actuating groove extending helically around a longitudinal axis of the actuating sleeve and formed on an inside of the actuating sleeve, into which actuating groove the at least one actuating projection of the plunger engages when the plunger is introduced into the actuating sleeve so as to cause the plunger to rotate about its longitudinal axis during an axial relative movement between the actuating sleeve and the plunger, wherein the spring is extended counter to its preloading as the plunger is rotated during introduction of the plunger into the actuating sleeve; and
a blocking device having a blocking element with a blocking position in which the plunger is held in a locked position so as to be blocked against a movement into the discharge position, wherein the blocking element is preloaded by a spring element into the blocking position, and the blocking device includes an actuator for disengaging the blocking element from the blocking position to permit movement of the plunger to the discharge position.

16. The actuating device as claimed in claim 15,
wherein the blocking element comprises a blocking bar, and wherein the plunger comprises a blocking recess, wherein the blocking bar is preloaded toward and into the blocking recess by the spring element when the plunger is in the locked position, and the blocking bar is movable counter to the spring element by the actuator into a release position retracted from the blocking recess.

17. The actuating device as claimed in claim 16,
wherein the actuator drives the blocking bar via a cam control mechanism having a drum cam, wherein a rotation of the actuator is converted into a linear movement of the blocking bar by the cam control mechanism.

18. The actuating device as claimed in claim 17,
wherein the spring element preloads the drum cam, in one direction, such that this preloading causes preloading of the blocking bar into the blocking position.

19. The actuating device as claimed in claim 18,
wherein the spring element is a torsion spring.

20. The actuating device as claimed in claim 15,
wherein the actuator is an electric motor having an output axis, wherein the output axis is perpendicular to the longitudinal axis of the plunger.

\* \* \* \* \*